(12) United States Patent
Jansen et al.

(10) Patent No.: US 8,342,320 B2
(45) Date of Patent: Jan. 1, 2013

(54) CONVEYOR CHAIN

(75) Inventors: Rutger Jansen, Maassluis (NL);
Franciscus Maria Bal, Vlaardingen (NL)

(73) Assignee: Rexnord FlatTop Europe B.V., Gv's-Gravenzande (NL)

(*) Notice: Subject to any disclaimer, the term of this patent is extended or adjusted under 35 U.S.C. 154(b) by 315 days.

(21) Appl. No.: 12/088,304

(22) PCT Filed: Sep. 29, 2006

(86) PCT No.: PCT/NL2006/000490
§ 371 (c)(1),
(2), (4) Date: Jul. 17, 2008

(87) PCT Pub. No.: WO2007/037686
PCT Pub. Date: Apr. 5, 2007

(65) Prior Publication Data
US 2009/0014290 A1    Jan. 15, 2009

(30) Foreign Application Priority Data
Sep. 29, 2005   (NL) .................................. 1030062

(51) Int. Cl.
*B65G 17/38*   (2006.01)
(52) U.S. Cl. .................... 198/853; 198/851; 198/852
(58) Field of Classification Search .............. None
See application file for complete search history.

(56) References Cited

U.S. PATENT DOCUMENTS

| | | | |
|---|---|---|---|
| 2,911,091 A | 11/1959 | Imse | |
| 3,868,011 A | 2/1975 | Janzen et al. | |
| 4,676,368 A | 6/1987 | Damkjaer et al. | |
| 5,797,820 A * | 8/1998 | Endo | 474/230 |
| 6,978,885 B1 * | 12/2005 | Schumacher | 198/851 |
| 2004/0244177 A1 | 12/2004 | Hartman et al. | |

FOREIGN PATENT DOCUMENTS

EP    0 829 434    3/1998

OTHER PUBLICATIONS

International Search Report corresponding to PCT/NL2006/000490 under date of mailing of Feb. 1, 2007.
"MCC Modular Conveyor Components," Cataloguemcc Modular Conveyor Components, Nov. 1995, pp. 1-5.

(Continued)

*Primary Examiner* — Kavel Singh
(74) *Attorney, Agent, or Firm* — Quarles & Brady LLP

(57) ABSTRACT

A conveyor chain (1), comprising a series of sheet metal chain links (2) which are each provided with a basically rectangular conveying body part (3) and with a hinge assembly (4), which hinge assembly comprises a centrally located hinge loop (7) and comprises a pair of hinge loops (10) spaced apart with an intermediate distance (9) on the opposite longitudinal side of the chain link, wherein the central loop is located in the intermediate space of a successive module (2'), wherein the hinge assembly (4) further comprises two auxiliary hinge loops (12), wherein the cooperating hinge loops of successive modules are connected by means of hinge pins (14), the thickness of the sheet metal of the conveying body part being between approximately 2.0 mm and approximately 2.8 mm, and wherein the diameter of the hinge pin is between approximately 3.0 and 5.0 mm.

20 Claims, 4 Drawing Sheets

OTHER PUBLICATIONS

Chinese Patent Application No. 200680035916.4, First Office Action (and English Translation thereof), Nov. 11, 2010.
Mexican Patent Application No. MX/a/2008/004120, Memo Summary of Official Action, Mar. 28, 2011.
European Patent Application No. 06 799 479.8-1261, Article 94(3) Communication, Mar. 11, 2009.
European Patent Application No. 06 799 479.8-1261, Response, Sep. 16, 2009.
Chinese Patent Application No. 200680035916.4, Response to First Office Action (and English Summary/Translation), May 23, 2011.
Mexican Patent Application No. MX/a/2008/004120, Response to Official Action (and English Summary/Translation), Jun. 27, 2011.
International Standard ISO 4348, Flat-Top Chains and Associated Chain Wheels for Conveyors, Second Edition, Dec. 1, 1983.
Rexnord 2010 Product Catalogue, pp. 11 and 15.
European Patent Application No. 06 799 479.8-1261, Appeal, May 9, 2011.
Mexican Patent Application No. MX/a/2008/004120, Official Action (and English Summary/Translation), Jul. 12, 2011.
Mexican Patent Application No. MX/a/2008/004120, Response to Official Action (and Machine Translation), Nov. 22, 2011.
Chinese Patent Application No. 200680035916.4, Official Action (and English Summary/Translation), Mar. 26, 2012.
Chinese Patent Application No. 200680035916.4, Response to Official Action (and English Summary/Translation), Jun. 11, 2012.

* cited by examiner

CONVEYOR CHAIN

The invention relates to a conveyor chain, comprising a series of sheet metal chain links which are each provided with a basically rectangular conveying body part and with a hinge assembly located below the conveying body part, which hinge assembly comprises a centrally located hinge loop on one longitudinal side of the conveying body part of the chain link, and comprises a pair of hinge loops spaced apart with an intermediate distance on the opposite longitudinal side of the chain link, while the central loop is located in the intermediate space of a successive module.

Such a conveyor chain is generally known and can be used for conveying bottles, cans et cetera in, for instance, breweries, soft drink bottling plants et cetera. Such chains are known for use on straight conveyor tracks as well as for use on conveyor tracks in which bends occur, in which latter case the chain can pass through a bend in a planar surface, and is known under the name "flex chain".

The customary chains of this type have a load bearing capacity of approximately 6000 N, i.e., the length of the chain increases excessively when a greater tractive force is exerted, whereby the chain wheel driving the chain can no longer function properly.

With the customary chain, the thickness of the sheet metal of the conveying body part is approximately 2.9 mm-3.1 mm, and the diameter of the hinge pin is approximately 6.0 mm-6.4 mm. The standard width of the hinge assembly is approximately 41-43 mm, and the pitch of the chain links is approximately 1.5 inch. Such a type of chain is so conventional that it has been standardized in DIN 8153/ISO 4348.

A drawback of the known chain is that when it is manufactured, the material costs are relatively high.

Further, for uses involving heavy loads, there is an extra wide conveyor chain, wherein the hinge assembly is provided with two auxiliary hinge loops, each located, with an intermediate space, next to the central loop on the longitudinal side, while the pair of hinge loops of a preceding module are each located in a second intermediate space. Such an extra wide "double hinge chain" is known from "MCC Modular conveyor components", MCC Modular conveyor components November 1995, page 3, FIG. 1.

The object of the invention is to provide an alternative conveyor chain to the chain standardized in DIN 8153/ISO 4348, with which the material costs can be considerably reduced with only a small concession as to load bearing capacity. To that end, the invention provides a conveyor chain, comprising a series of sheet metal chain links which are each provided with a basically rectangular conveying body part, and with a hinge assembly located below the conveying body part, which hinge assembly comprises a centrally located hinge loop on one longitudinal side of the conveying body part of the chain link, and a pair of hinge loops spaced apart with an intermediate distance on the opposite longitudinal side of the chain link, while the central loop is located in the intermediate space of a successive module, wherein the hinge assembly further comprises two auxiliary hinge loops each located, with a second intermediate space, next to the central loop on the longitudinal side of the conveying body part of the chain link, while the pair of hinge loops of a preceding module are each located in a second intermediate space, wherein the cooperating hinge loops of successive modules are connected by means of hinge pins, the thickness of the sheet metal of the conveying body part being between approximately 2.0 mm and approximately 2.8 mm, and wherein the diameter of the hinge pin is between approximately 3.0 and 5.0 mm.

Through a considerably reduction of the thickness of the sheet metal of the conveying body part and the hinge pin, and arranging the hinge to be of double design, a chain can be realized with a load bearing capacity that approximates the load bearing capacity of the conventional chain closely, while the material costs however can be considerably lower.

Through the use of a combination of, precisely, a double hinge and the dimensions mentioned, a chain can be realized corresponding, as to width, to the standardized chain and approximating, as to load bearing capacity, the standardized chain closely, but whose material costs are considerably lower.

When the thickness of the sheet metal of the conveying body part is approximately 2.5 mm, when the diameter of the hinge pin is approximately 4.0 mm, when the hinge width is approximately 42 mm and when the pitch between the chain links is approximately 1 inch (2.54 cm), from the same sort of sheet metal used for a conventional stainless steel chain (for instance material number 1.4589), a chain can be obtained with a load bearing capacity of approximately 5000 N, and a considerably calmer conveying course, while the material costs of the chain links can be approximately 20% lower.

Further advantageous embodiments of the invention are represented in the subclaims.

The invention also relates to a chain link and to a hinge pin.

The invention will be further elucidated on the basis of an exemplary embodiment which is represented in a drawing.

In the drawing,

FIG. 1b shows a side view of the chain of FIG. 1a;

FIG. 1c shows a front view of the chain of FIG. 1a;

FIG. 2b shows a side view of the chain of FIG. 2a; and

FIG. 2c shows a front view of the chain of FIG. 2a.

In the Figures, identical or corresponding parts are indicated with the same reference numerals. The drawings are only schematic representations of preferred embodiments of the invention which are given by way of non-limitative exemplary embodiment.

Figure 1A:
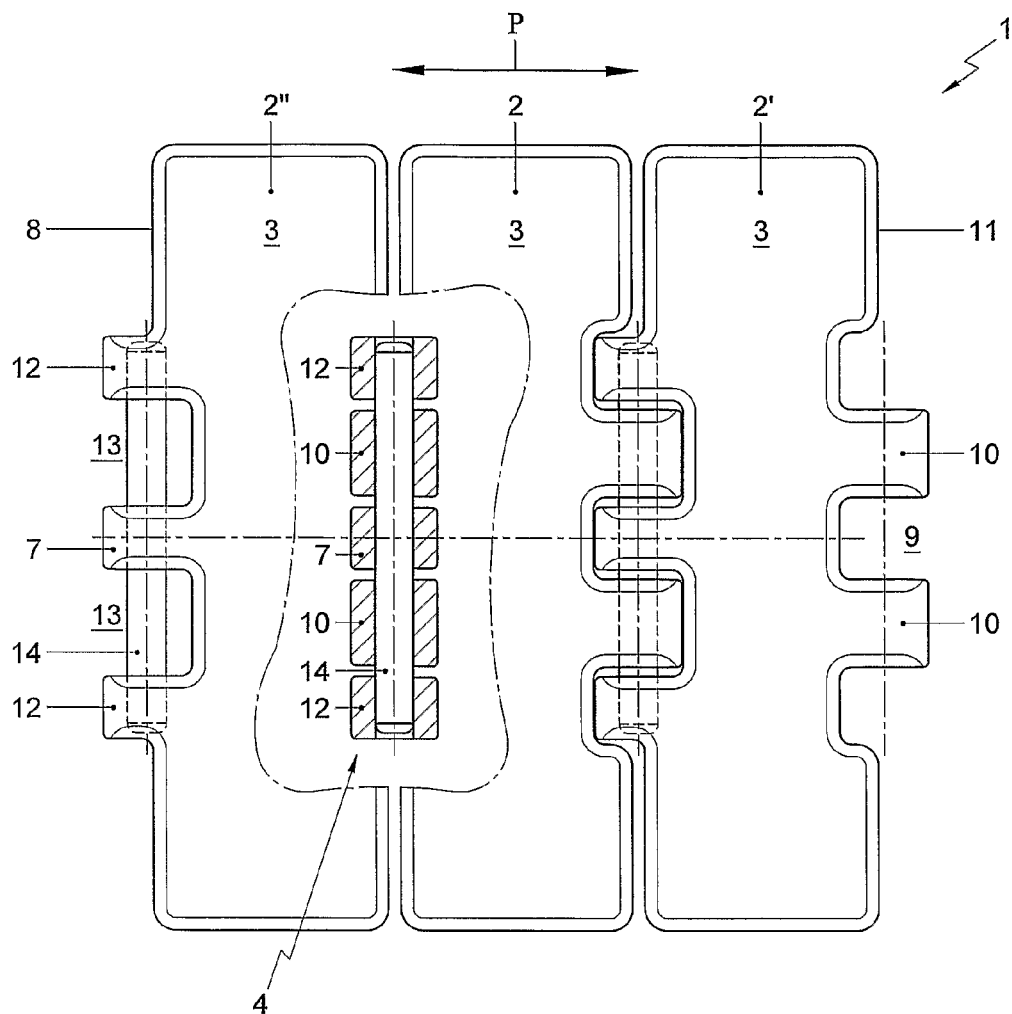
FIG. 1a shows a schematic top plan view of a first embodiment of a conveyor chain according to the invention.
Figure 1B:
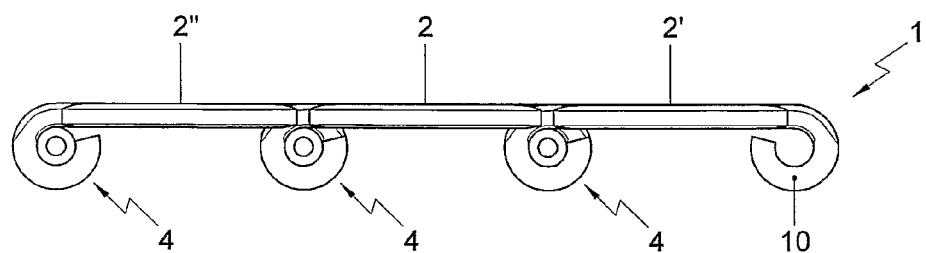
Figure 1C:
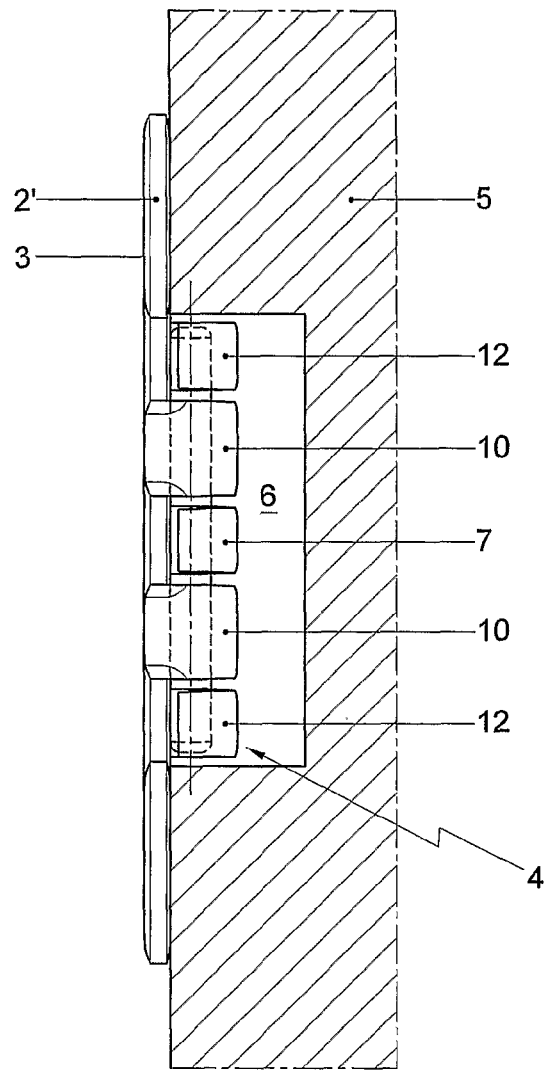

FIGS. 1a-c show a conveyor chain 1, comprising a series of sheet metal chain links 2. The chain links 2 are each provided with a basically rectangular conveying body part 3 and with a hinge assembly 4 located below the conveying body part 3. The conveyor chain 3 is intended to be moved, during use, in a conveying direction indicated with arrow P, along a conveying track 5. The conveying track 5 supports the conveying body part 3 and is provided with a groove 6 for guiding the hinge assembly 4 therein.

In a manner known to the skilled person, the sheet metal chain links have been punched from sheet metal while forming the hinge loops. In this exemplary embodiment, the chain links are manufactured from ferritic-pearlitic stainless steel with, for instance, material number 1.4589, 1.4016 or 1.4017.

The hinge assembly 4 comprises a centrally located hinge loop 7 on a longitudinal side 8 of the conveying body part 3 of the chain link 3, and further a pair of hinge loops 10 spaced apart with an intermediate distance 9 transverse to the conveying direction on the opposite longitudinal side 11 of the chain link 2.

The central hinge loop is located in the intermediate space 9 of a successive module 2'.

The hinge assembly 4 further comprises two auxiliary hinge loops 12, each located, with a second intermediate space 13, next to the central loop 7 of the longitudinal side 8 of the conveying body part of the chain link 2. The pair of hinge loops 10 of a preceding module 2" are each included in a second intermediate space.

The cooperating hinge loops 7, 12 on the one side, and 10 on the other side, of successive modules are connected by means of steel hinge pins 14.

In this exemplary embodiment, the hinge pins are designed in one piece. It will be clear that, if desired, the hinge pins can be designed in more parts, for instance two successive parts transverse to the conveying direction. Preferably, the pins are manufactured from stainless steel, but can also be manufactured from a different material.

The hinge pins 14 are fitted with a somewhat clamping fit in the hinge loops 7, 12 of the longitudinal side 8, while the pair of hinge loops 10 on the opposite longitudinal side 11 is fitted with a loose fit. As shown here, it is preferred that the hinge loops on the opposite longitudinal sides, together, have a substantially equal width.

In this exemplary embodiment, the thickness of the sheet metal of the conveying body part is 2.5 mm, and the diameter of the hinge pins is 4.0 mm.

The width of the hinge assembly is 42.2 mm, while, in this example, the pitch between successive chain links is 25.4 mm. Naturally, the pitch can also be chosen to be different, for instance 1.5" (38.1 mm).

The length of the hinge pin is approximately 40 mm. In this exemplary embodiment, the material of the hinge pins is chosen with a composition comprising more than approximately 0.6 wt. % of carbon, and approximately 15-19 wt. % of chromium. Such a type of material is described in NL 1023383 for the hinge pin.

Other steel pin materials are pin materials with material numbers 1.4057, 1.4125 or 1.4462.

Figure 2A:
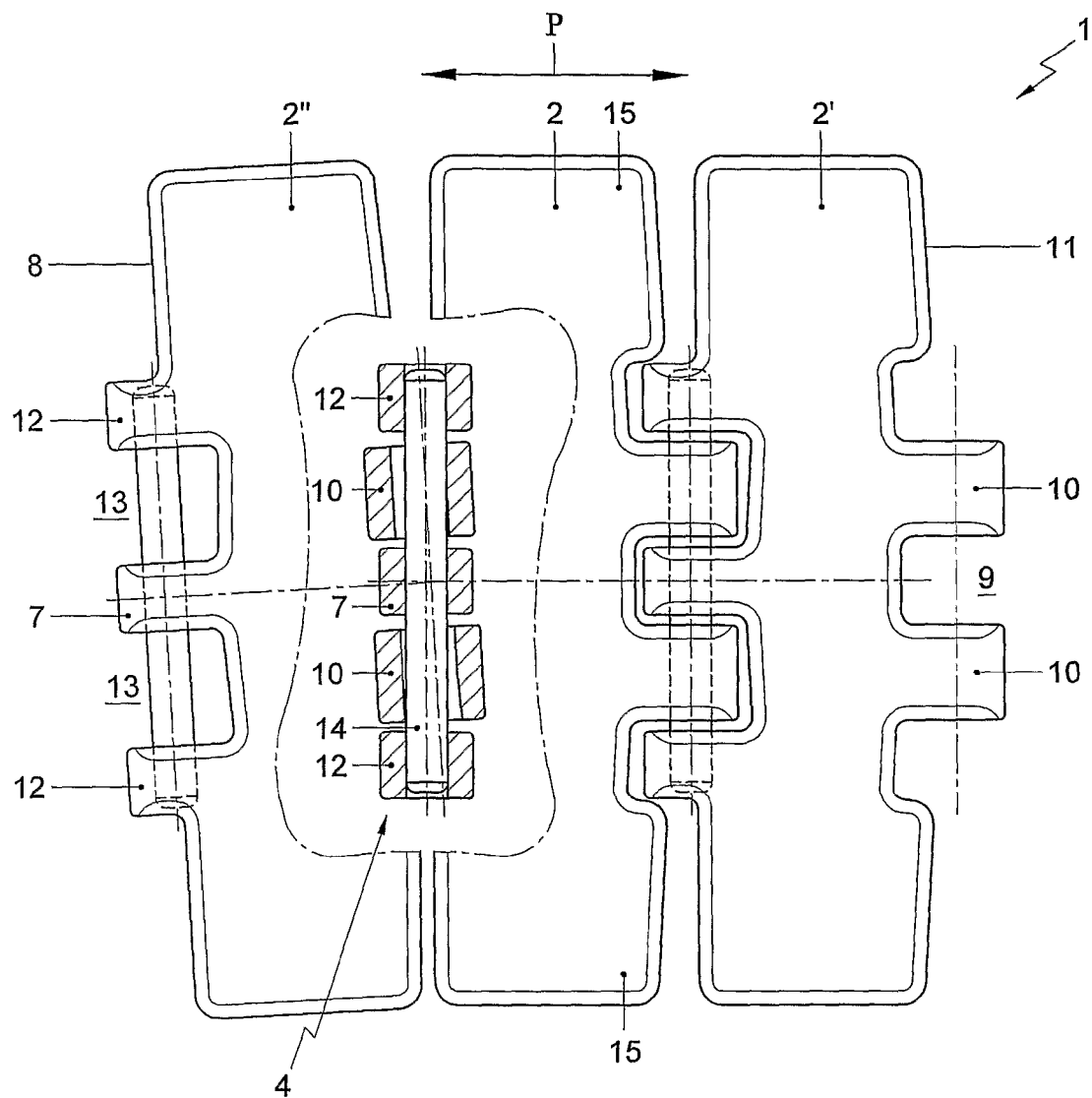
FIG. 2a shows a schematic top plan view of a second embodiment of a chain according to the invention.
Figure 2B:
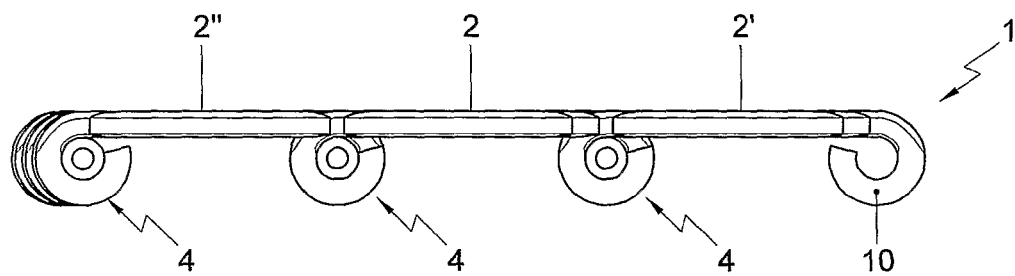
Figure 2C:
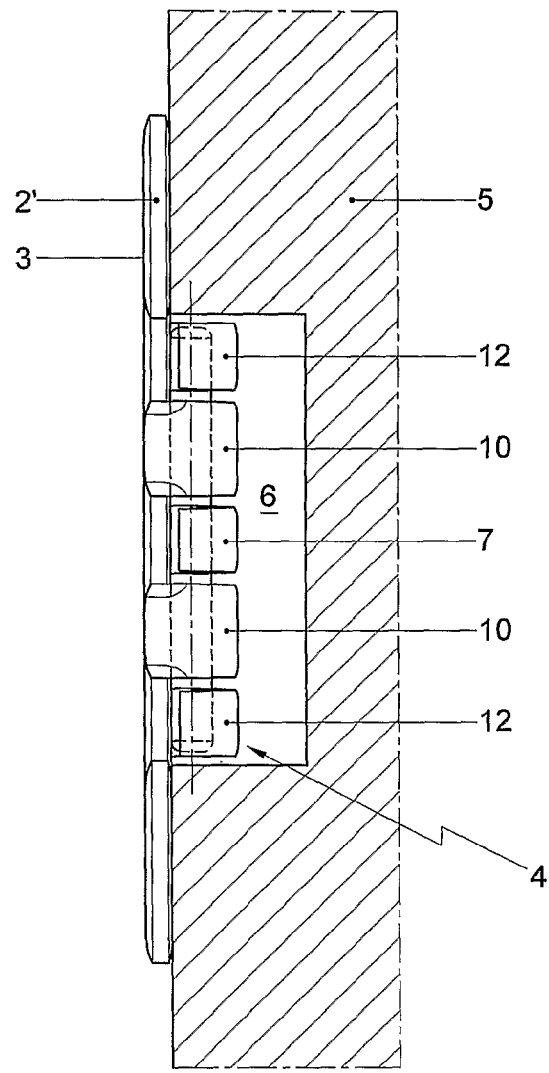

FIGS. 2a-c show a variant of the conveyor chain of FIGS. 1a-c. Here, the longitudinal side 8 of the modules is narrowed adjacent the sheet ends 15, and the pair of hinge loops 10 on the opposite longitudinal side 11 is of oversized design. As a result, a flex chain is formed, capable of passing through a bend in a plane surface.

The invention is not limited to the exemplary embodiment represented here. For instance, the hinge pin may also be fitted in the pair of loops at the opposite side, while the central hinge loop and the auxiliary hinge loops have a loose fit or an oversized fit. Further, the width of the hinge loops can be chosen to be mutually unequal per side, for instance a relatively wide central hinge loop and narrower auxiliary hinge loops.

It will be clear to the skilled person that many variations are possible within the range of the invention as set forth in the following claims.

The invention claimed is:

1. A conveyor chain, comprising a series of sheet metal chain links which are each provided with a basically rectangular conveying body part and with a hinge assembly located below the conveying body part, which hinge assembly comprises a centrally located hinge loop on one longitudinal side of the conveying body part of the chain link, and comprises a pair of hinge loops spaced apart with an intermediate distance on the opposite longitudinal side of the chain link, while the central loop is located in the intermediate space of a successive module,
   wherein the hinge assembly further comprises two auxiliary hinge loops, each located, with a second intermediate space, next to the central loop on the longitudinal side of the conveying body part of the chain link, while the pair of hinge loops of a preceding module are each located in a second intermediate space,
   wherein the cooperating hinge loops of successive modules are connected by means of hinge pins, the thickness of the sheet metal of the conveying body part being between 2.0 mm and 2.8 mm, and
   wherein the diameter of the hinge pin is between 3.0 mm and 5.0 mm.

2. A conveyor chain according to claim 1, wherein the thickness of the sheet metal of the conveying body part is 2.5 mm and the diameter of the pin is 4.0 mm.

3. A conveyor chain according to claim 1, wherein the width of the hinge assembly is between 41 mm and 43 mm.

4. A conveyor chain according to claim 1, wherein the hinge pin is manufactured from steel.

5. A conveyor chain according to claim 1, wherein the length of the hinge pin is between 38 mm and 42 mm.

6. A conveyor chain according to claim 1, wherein the pitch between successive chain links is one inch (25.4 mm).

7. A conveyor chain according to claim 1, wherein the pitch between successive chain links is 1.5 inch (38.1 mm).

8. A conveyor chain according to claim 1, wherein a longitudinal side of the conveying body part is narrowed adjacent the ends, and wherein the hinge loops of one of the sides are of oversized design such that successive chain links can pass through a bend in a plane surface.

9. A conveyor chain according to claim 1, wherein the width of the hinge loops per side is mutually unequal.

10. A sheet metal chain link, comprising a basically rectangular conveying body part and a hinge assembly located below the conveying body part,
   which hinge assembly comprises a centrally located hinge loop on one longitudinal side of the conveying body part of the chain link, and a pair of hinge loops spaced apart with an intermediate distance on the opposite longitudinal side of the chain link,
   wherein the hinge assembly further comprises two auxiliary hinge loops, each located, with a second intermediate space, next to the central loop on the longitudinal side of the conveying body part of the chain link,
   wherein the thickness of the sheet metal of the conveying body part is between 2.0 mm and 2.8 mm, and
   wherein the inside diameter of the hinge loops is between 3.0 mm and 5.0 mm.

11. A chain link according to claim 10, wherein the thickness of the sheet metal of the conveying body part is 2.5 mm and wherein the inside diameter of the hinge loops is 4.0 mm.

12. A chain link according to claim 10, wherein the width of the hinge assembly on the first longitudinal side is between 41 mm and 43 mm.

13. A chain link according to claim 10, wherein the pitch between the hinge loops on the opposite longitudinal sides is 1 inch (25.4 mm).

14. A chain link according to claim 10, wherein the pitch between the hinge loops on the opposite longitudinal sides is 1.5 inch (38.1 mm).

15. A chain link according to claim 10, wherein the width of the hinge loops per side is mutually unequal.

16. A conveyor chain according to claim 1, wherein the hinge pins comprise a substantially cylindrical steel body part with a diameter of 4 mm, a length which is between 38 mm and 42 mm,
   wherein the steel is an alloy comprising more than 0.6% by weight of carbon and 15-19% by weight of chromium.

17. A conveyor chain according to claim 4, wherein the hinge pin is manufactured from stainless steel comprising more than 0.6% by weight of carbon and 15-19% by weight of chromium.

18. A chain link according to claim 10, further comprising a hinge pin comprising a substantially cylindrical steel body part with a diameter of 4 mm, a length which is between 38 mm and 42 mm,
 wherein the steel is an alloy comprising more than 0.6% by weight of carbon and 15-19% by weight of chromium.

19. A sheet metal chain link, comprising:
 a conveying body part made of sheet metal defining a longitudinal side and an opposite longitudinal side;
 a hinge assembly located below the conveying body part, the hinge assembly comprising:
  a centrally located hinge loop on the longitudinal side;
  two auxiliary hinge loops on the longitudinal side, each defining an intermediate space from the centrally located hinge loop, and defining a width of the hinge assembly;
  a pair of hinge loops on the opposite longitudinal side, defining an intermediate distance between the pair of hinge loops;
 wherein a thickness of the sheet metal is between 2.0 mm and 2.8 mm;
 wherein an inside diameter of at least one of the centrally located hinge loop, the two auxiliary hinge loops, and the pair of hinge loops is between 3.0 mm and 5.0 mm; and
 wherein the width of the hinge assembly is between 41 mm and 43 mm.

20. The sheet metal chain link of claim 19, wherein:
the thickness is 2.5 mm;
the inside diameter is 4.0 mm; and
the width is 42.2 mm.

\* \* \* \* \*